United States Patent [19]

Hirose et al.

[11] Patent Number: 4,609,856
[45] Date of Patent: Sep. 2, 1986

[54] SLOT DETECTING APPARATUS

[75] Inventors: Yoshiyuki Hirose, Yokohama; Kyuji Kiryu, Sagamihara, both of Japan

[73] Assignee: Tokico Ltd., Japan

[21] Appl. No.: 671,898

[22] Filed: Nov. 15, 1984

[30] Foreign Application Priority Data

Nov. 18, 1983 [JP] Japan .................. 58-217267

[51] Int. Cl.$^4$ .............................................. G05B 1/06
[52] U.S. Cl. .................. 318/640; 318/480; 318/567; 250/226
[58] Field of Search ............ 318/640, 577, 480, 561; 250/202, 204, 226, 561; 414/730

[56] References Cited

U.S. PATENT DOCUMENTS 3,610,935 10/1971 Voros .................................. 250/202
4,476,982 10/1984 Paddock .............................. 250/226

Primary Examiner—William M. Shoop, Jr.
Assistant Examiner—Patrick C. Keane
Attorney, Agent, or Firm—Andrus, Sceales, Starke & Sawall

[57] ABSTRACT

A slot detecting apparatus comprises a sensor for detecting a slot of a workpiece, comparators, and a discriminating circuit. The sensor moves over the workpiece so as to traverse the slot and produce an output having a waveform which is substantially an M-shape. The comparators compare the level of the output of the sensor with a plurality of threshold levels which are mutually different, and each produce a comparison result for each of the plurality of threshold levels. The discriminating circuit discriminates the position of the slot based on a comparison result which indicates that the output of the sensor has a waveform which is substantially an M-shape, from among a plurality of comparison results which are obtained from the comparators for the plurality of threshold levels.

2 Claims, 26 Drawing Figures

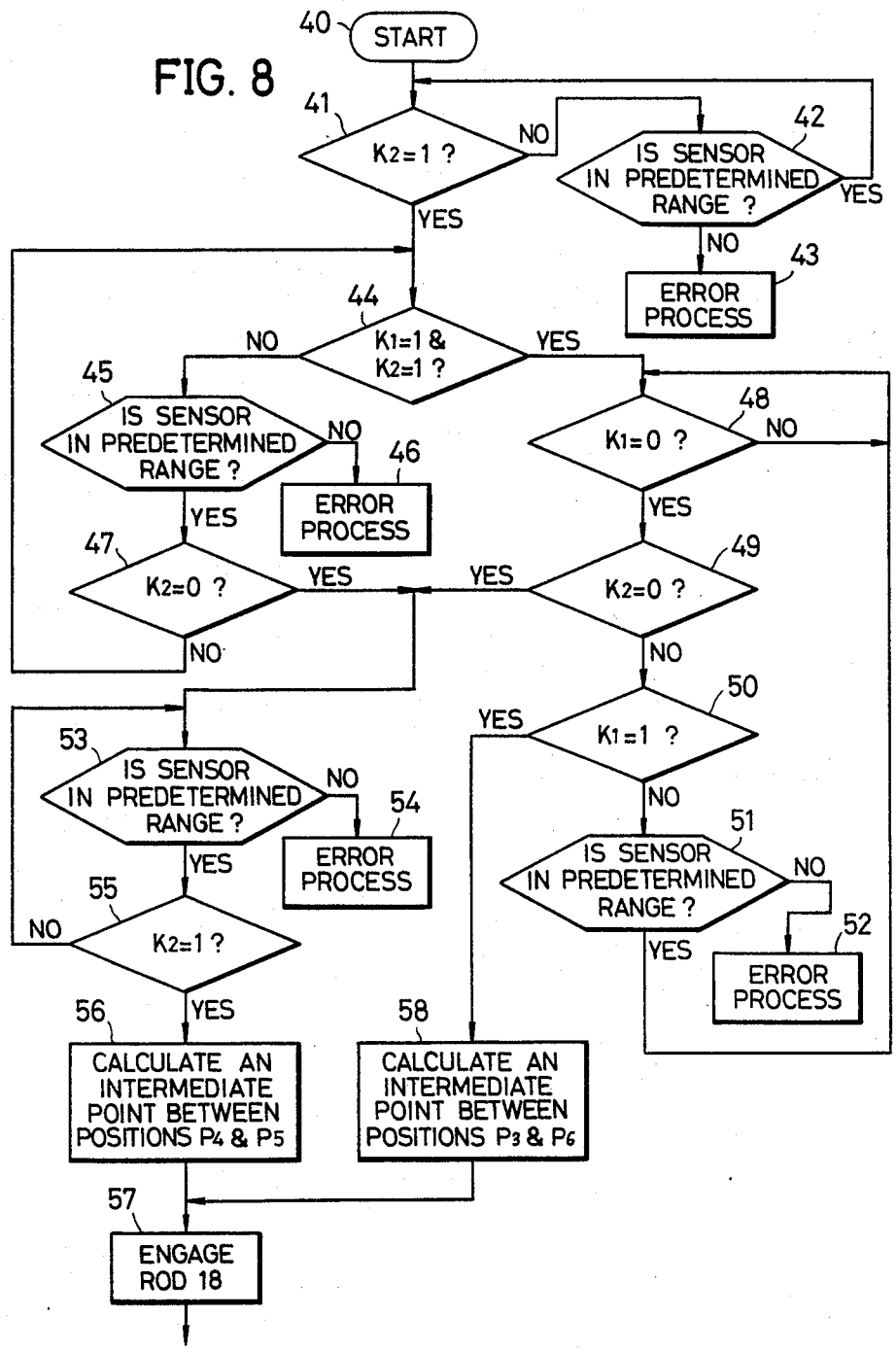

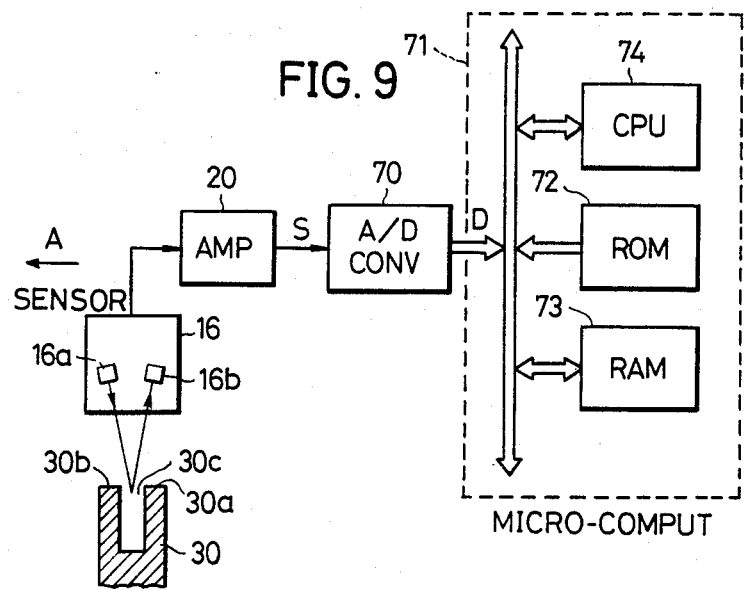
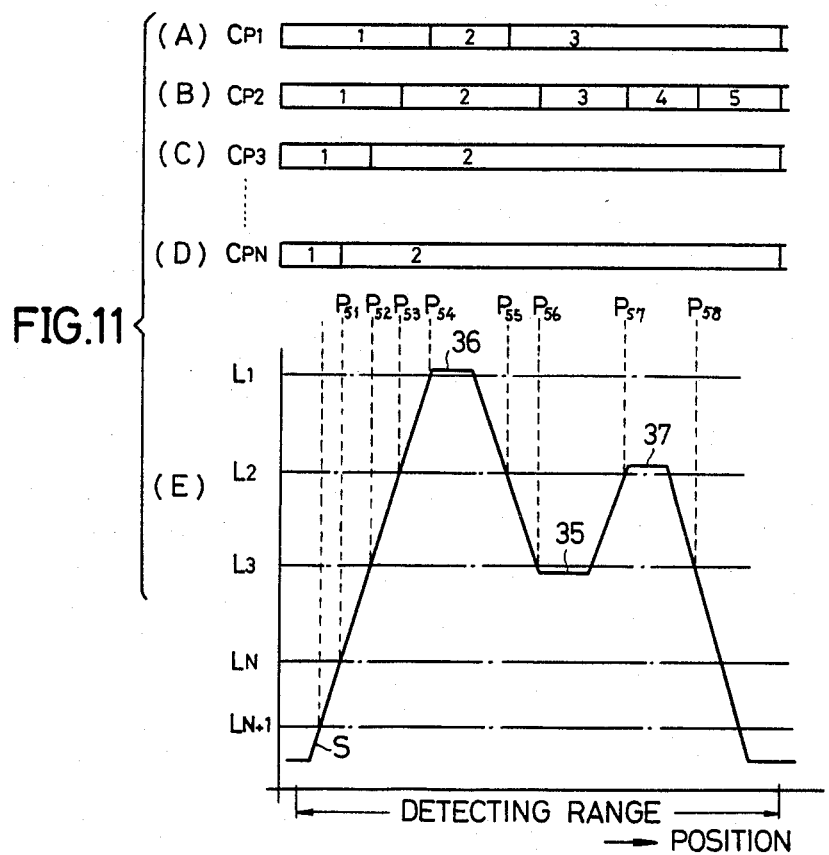

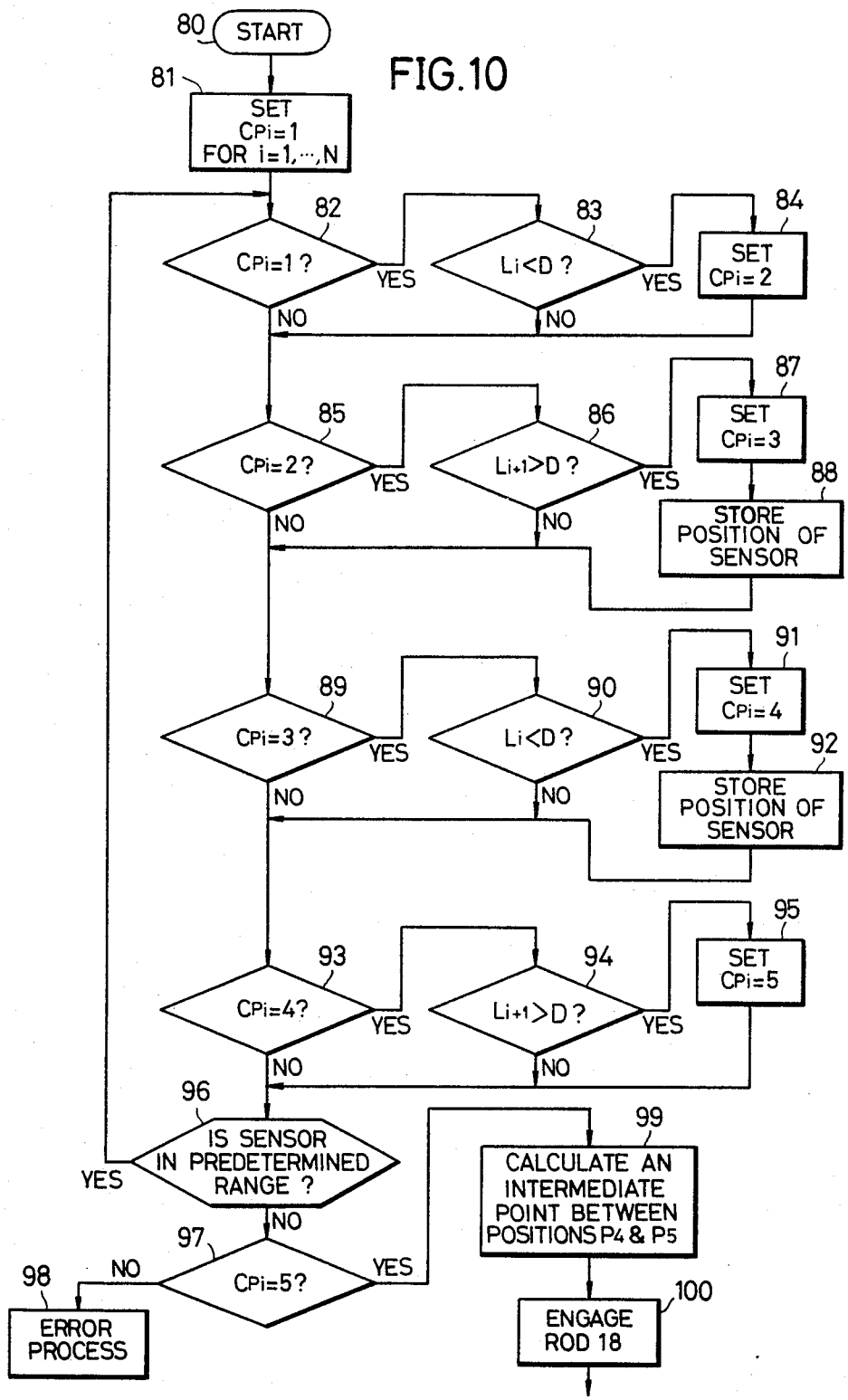

SLOT DETECTING APPARATUS

BACKGROUND OF THE INVENTION

The present invention generally relates to slot detecting apparatuses, and more particularly to a slot detecting apparatus which is applied to an industrial robot such as a painting robot and is suited for detecting a slot of a workpiece.

Recently, a painting robot is used to automatically paint the inside of a workpiece having a door, such as a locker. The painting robot has a painting unit provided at the tip end of an arm, and a rod for engaging and opening the door of the workpiece together with the painting unit. When the workpieces are conveyed, the workpieces do not necessarily assume the same state. In other words, the workpieces are not all necessarily conveyed with the respective doors closed, and some workpieces may be conveyed with the respective doors open halfway, for example. Thus, when the painting robot opens the door of a workpiece so as to paint the inside of the workpiece, it is necessary to detect the position of the door so that the painting robot can discriminate the position where the door may be engaged.

Accordingly, there is a conventional detecting apparatus which detects a window frame of the door, by using the fact that the door has a window frame made up of a pair of window frame parts which define a slot for receiving a glass window. This conventional detecting apparatus comprises a light emitting element and a light receiving element, and is designed to detect a window frame by noting that the light emitted from the light emitting element is not reflected at the slot but is reflected by the pair of window frame parts which define the slot. When detecting a window frame, an output level of the light receiving element is compared with a predetermined threshold level. It is detected that the light emitted from the light emitting element is reflected by a window frame part and a window frame detection signal is produced from the detecting apparatus, when the output level of the light receiving element exceeds the predetermined threshold level. The painting robot operates in a predetermined sequence responsive to the output detection signal of the detecting apparatus.

However, the reflection factor of the window frame differs depending on the color of the workplace. For this reason, when the color of the workpiece is known, it is possible to set the threshold level which is in accordance with the reflection factor of the color of the workpiece. However, in a case where workpieces of different colors are conveyed at predetermined intervals, there is a problem in that the threshold level must be changed in accordance with the color of the workpiece every time the color of the workpiece changes. Further, in a case where workpieces of different colors are conveyed at random and the threshold level is fixed, there is a disadvantage in that only the window frames of workpieces having predetermined colors can be detected and the window frames of workpieces having other colors cannot be detected.

SUMMARY OF THE INVENTION

Accordingly, it is a general object of the present invention to provide a novel and useful slot detecting apparatus in which the disadvantages described heretofore are eliminated.

Another and more specific object of the present invention is to provide a slot detecting apparatus which is designed to detect a slot by comparing a reflected light from a workpiece with a plurality of threshold values, and is suited for use in an industrial robot such as a painting robot. According to the slot detecting apparatus of the present invention, it is possible to positively detect a slot regardless of the color of the workpiece.

Other objects and further features of the present invention will be apparent from the following detailed description when read in conjunction with the accompanying drawings.

BRIEF DESCRIPTION OF THE DRAWINGS

FIG. 8 is a flow chart for explaining the operation of a microcomputer in the block system shown in FIG. 2;

FIG. 9 is a systematic block diagram showing a second embodiment of a slot detecting apparatus according to the present invention;

FIG. 10 is a flow chart for explaining the operation of a microcomputer in the block system shown in FIG. 9; and FIGS. 11(A) through 11(D) show the manner in which comparison data are renewed; and FIG. 11(E) shows an output signal waveform of a sensor in the block system shown in FIG. 9.

DETAILED DESCRIPTION

First, description will be given with respect to a first embodiment of a slot detecting apparatus according to the present invention which is applied to a painting robot, by referring to FIGS. 1 through 8.

Figure 2:
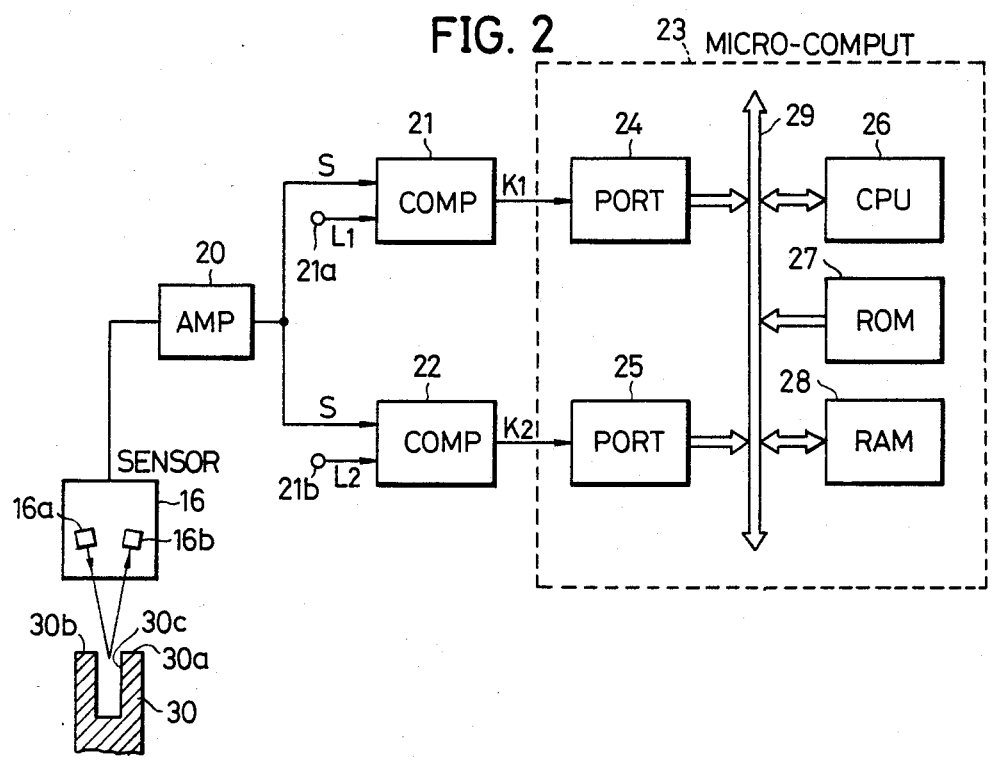
FIG. 2 is a systematic block diagram showing a first embodiment of a slot detecting apparatus according to the present invention.

A painting robot 10 which is applied with the slot detecting apparatus according to the present invention, is used to paint the inside of a workpiece having a door, such as a locker. A main robot body 11 of the robot 10, comprises an arm 12. A painting unit 14 is provided in a freely rotatable and displaceable manner on the tip end of the arm 12, by way of a flexible wrist 13. The painting unit 14 comprises a base 15 which is mounted on the flexible wrist 13, a sensor 16 which is mounted on the base 15, a spray gun 17 for spraying paint, and a rod 18 which is supported by a rod support member (not shown) in a state where the rod 18 projects downwardly from the base 15. As shown in FIG. 2, the sensor 16 comprises a light emitting diode 16a and a phototransistor 16b for receiving reflected light.

An output terminal of the sensor 16 is coupled to input terminals of first and second comparators 21 and 22, through an amplifier 20. The first comparator 21 compares an output S of the sensor 16 with a first reference (threshold) level $L_1$ which is applied to a terminal 21a. On the other hand, the second comparator 22 compares the output S of the sensor 16 with a second reference (threshold) level $L_2$ which is applied to a terminal 22a. The first comparator 21 produces a signal $K_1$ which assumes a level "1" when the output S of the sensor 16 is greater than the first threshold level $L_1$ and assumes a level "0" when the output S is smaller than the first threshold level $L_1$. Similarly, the second comparator 22 produces a signal $K_2$ which assumes a level "1" when the output S of the sensor 16 is greater than the second threshold level $L_2$ and assumes a level "0" when the output S is smaller than the second threshold level $L_2$. The threshold levels $L_1$ and $L_2$ are selected so that the waveform of the output S intersects one of the threshold levels $L_1$ and $L_2$ four times even when the level of the output S changes according to the color of the workpiece.

Output terminals of the comparators 21 and 22 are coupled to respective input ports 24 and 25 of a microcomputer 23. The microcomputer 23 comprises a central processing unit (CPU) 26, a read only memory (ROM) 27 for storing programs, and a random access memory (RAM) 28 for providing work area. The ports 24 and 25, the CPU 26, the ROM 27, and the RAM 28 are coupled together through a bus 29.

Figure 1:
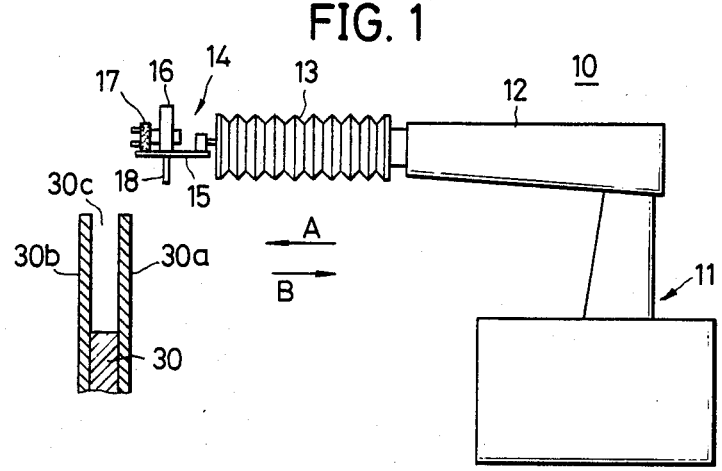
FIG. 1 is a general side view showing a painting robot which is applied with a slot detecting apparatus according to the present invention.

In FIG. 1, a door 30 of a workpiece such as a locker (not shown), is provided on the workpiece in a manner such that the door 30 is free to open and close. The door 30 has a rectangular window frame. The window frame is made up of an outer window frame part 30a, an inner window frame part 30b, and a slot 30c which is defined by the window frame parts 30a and 30b and is designed to receive a glass plate.

The robot 10 is controlled by the microcomputer 23, and generally operates in a manner described hereinafter. First, the arm 12 moves in the direction of an arrow A together with the painting unit 14, and the sensor 16 passes above the window frame parts 30a and 30b. As will be described later on in the specification, the slot 30c of the window frame is relatively detected by detecting the window frame parts 30a and 30b. Next, the painting unit 14 is returned slightly in the direction of an arrow B, and the rod 18 is inserted into the slot 30c which is detected. The arm 12 is then moved in the direction of the arrow B. As a result, the slot 30c in the window frame of the door 30 is engaged by the rod 18 and the door 30 is opened. The rod 18 is then extracted from the slot 30c, and the arm 12 moves in the direction of the arrow A. The painting unit 14 enters into the workpiece through an opening which is formed in the workpiece by the open door 30, and the spray gun 17 sprays paint so as to paint the inside of the workpiece. After the inside of the workpiece is painted, the painting unit 14 recedes from within the workpiece by moving in the direction of the arrow B, and the painting operation with respect to one workpiece is completed in this manner.

Next, description will be given with respect to the waveforms of the output S which is obtained from the phototransistor 16b of the sensor 16 and how the slot 30c is detected based on the output S as the sensor 16 passes over the window frame part 30a, the slot 30c, and the window frame part 30b, by referring to FIGS. 3 through 7.

Figure 3:
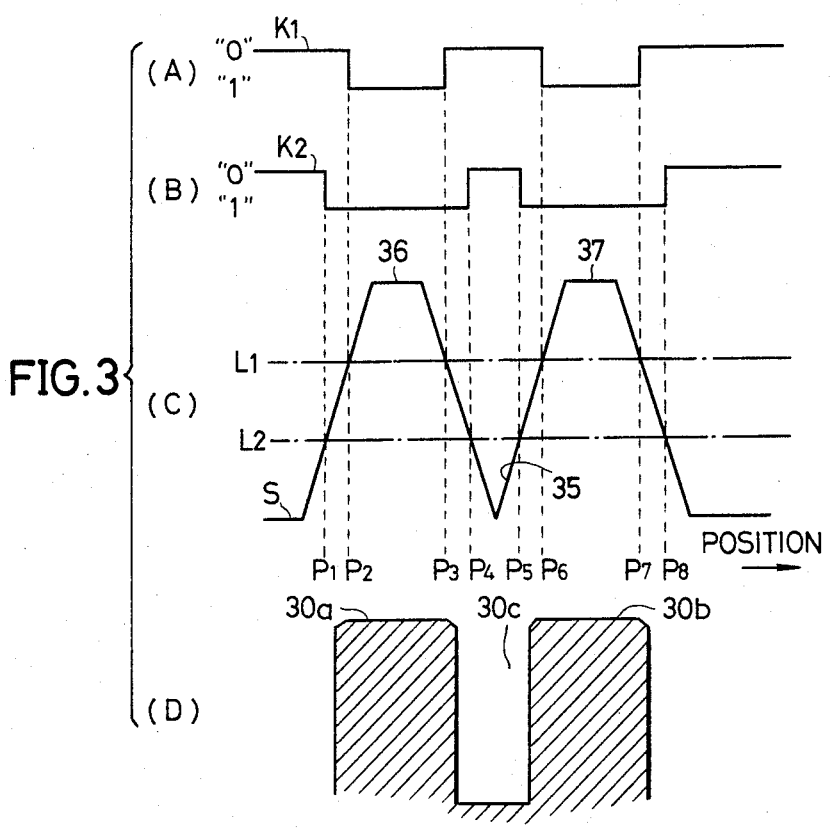
FIGS. 3(A) and 3(B) show output signal waveforms of first and second comparators in the block system shown in FIG. 2.
FIG. 3(C) shows an output signal waveform of a sensor in the block system shown in FIG. 2.
FIG. 3(D) shows parts of a window frame in an enlarged scale.
Figure 4:
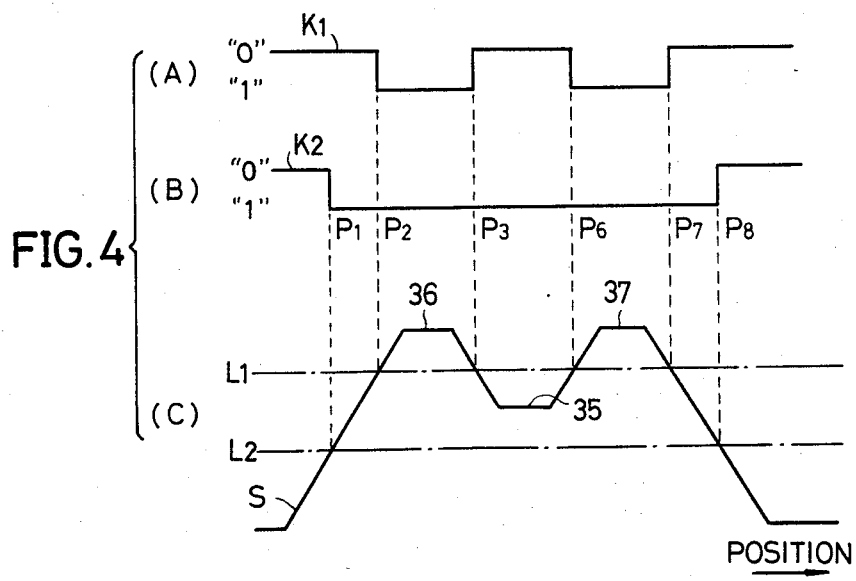
FIGS. 4(A) through 4(C), FIGS. 5(A) through 5(C), FIGS. 6(A) through 6(C), and FIGS. 7(A) through 7(C) respectively show other object signal waveforms of the first and second comparators in the block system shown in FIG. 2 in correspondence with another output signal waveform of the sensor in the block system shown in FIG. 2.
Figure 5:
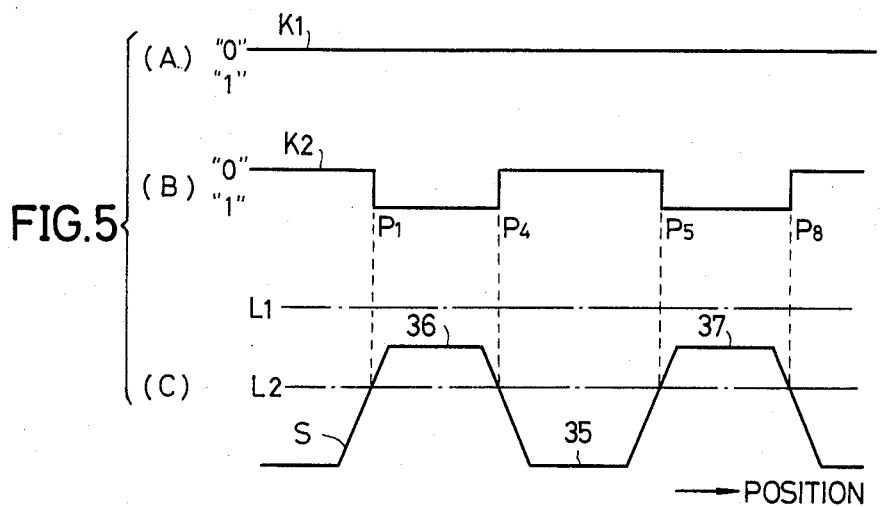
Figure 6:
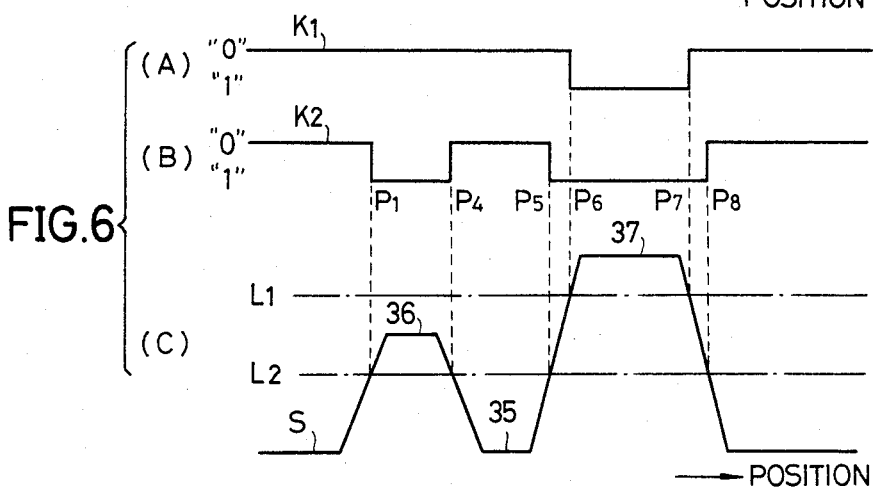
Figure 7:
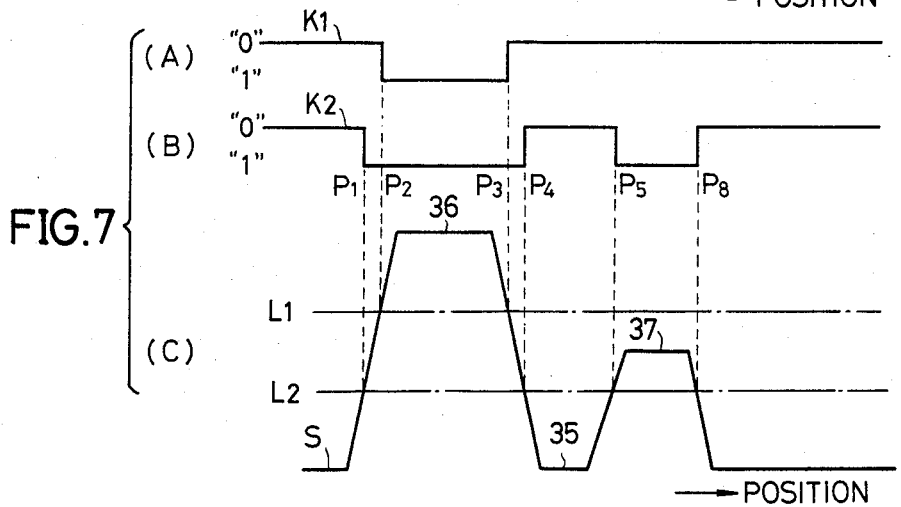

FIG. 3(C) shows the waveform of the output S of the phototransistor 16b which is amplified in the amplifier 20, as the sensor 16 passes over a standard window frame. When the sensor 16 moves to a position confronting the window frame part 30a as shown in FIG. 2, the phototransistor 16b receives the light which is emitted from the light emitting diode 16a and is reflected by the upper surface of the window frame part 30a, and the level of the output S increases. As the sensor 16 moves to a position above the slot 30c, the reflected light towards the phototransistor 16b decreases, and the level of the output S accordingly decreases. There is virtually no reflected light towards the phototransistor 16b when the sensor 16 is positioned immediately above the slot 30c, and the level of the output S is substantially zero in this state. In addition, as the sensor 16 moves to a position above the window frame part 30b, the reflected light towards the phototransistor 16b increases, and the level of the output S increases. As the sensor 16 passes beyond the position above the window frame part 30b, the level of the output S decreases again. Accordingly, the output S has a waveform shown in FIG. 3(C) which is substantially an M-shape, with first and second peaks 36 and 37 on both sides of a valley 35. In FIGS. 3 through 7 and 11, the horizontal axis represents the position of the sensor 16.

As shown in FIG. 3(C), the waveform of the output S intersects the first and second threshold levels $L_1$ and $L_2$ four times. The first comparator 21 compares the level of the output S with the first threshold level $L_1$ and produces the signal $K_1$ shown in FIG. 3(A). The signal $K_1$ assumes a level "1" at a position $P_2$, a level "0" at a position $P_3$, a level "1" at a position $P_6$, and a level "0" at a position $P_7$. In other words, the signal $K_1$ assumes the level "1" at two positions. Similarly, the second comparator 22 compares the level of the output S with the second threshold level $L_2$ and produces the signal $K_2$ shown in FIG. 3(B). The signal $K_2$ assumes a level "1" at a position $P_1$, a level "0" at a position $P_4$, a level "1" at a position $P_5$, and a level "0" at a position $P_8$. That is, the signal $K_2$ assumes the level "1" at two positions.

The circuit shown in FIG. 2 is designed based on negative logic, and for this reason, a high level is illustrated as a level "0" and a low level is illustrated as a level "1" in FIGS. 3(A) and 3(B). In addition, in the description which follows, the output signals $K_1$ and $K_2$ of the comparators 21 and 22 will be referred to as a low-sensitivity signal $K_1$ and a high-sensitivity signal $K_2$, respectively. This is because the threshold level $L_2$ of the comparator 22 is lower than the threshold level $L_1$ of the comparator 21, and the comparator 22 is more sensitive in responding to the output S having a small level.

As will be described later on in the specification, the microcomputer 23 detects the slot 30c by discriminating that at least one of the low-sensitivity signal $K_1$ and the high-sensitivity signal $K_2$ has assumed the level "1" twice.

In a case where the color of the window frame is white or a light color having a large reflection factor, the phototransistor 16b receives the light reflected by the window frame, and the output S of the sensor 16 may assume a waveform shown in FIG. 4(C), for example. In this case, the level of the output S as a whole is high, and the valley 35 exceeds the second threshold level $L_2$. The waveform of the output S in this case intersects the second threshold level $L_2$ only twice, but intersects the first threshold level $L_1$ four times.

In this case, the second comparator 22 produces a high-sensitivity signal $K_2$ shown in FIG. 4(B) which assumes a level "1" at a position $P_1$ and a level "0" at a position $P_8$. On the other hand, the first comparator 21 produces a low-sensitivity signal $K_1$ shown in FIG. 4(A) which assumes a level "1" at a position $P_2$, a level "0" at a position $P_3$, a level "1" at a position $P_6$ and a level "0" at a position $P_7$. In other words, the low-sensitivity signal $K_1$ assumes the level "1" twice. Hence, the slot 30c can be detected based on the low-sensitivity signal $K_1$.

On the other hand, when the color of the window frame is black or a dark color having a small reflection factor, the level of the output S decreases as a whole. As shown in FIG. 5(C), for example, the peaks 36 and 37 may not reach the first threshold level $L_1$. In this case, the waveform of the output S does not intersect the first threshold level $L_1$, but intersects the second threshold level $L_2$ four times.

In this case, the first comparator 21 produces a signal $K_1$ shown in FIG. 5(A) which constantly assumes a level "0". The second comparator 22 produces a signal $K_2$ shown in FIG. 5(B) which assumes a level "1" at a position $P_1$, a level "0" at a position $P_4$, a level "1" at a position $P_5$, and a level "0" at a position $P_8$. In other words, the signal $K_2$ assumes the level "1" twice. In this case, the slot 30c is detected based on this signal $K_2$.

The sensor 16 may be affected by external disturbances when detecting the window frame. FIG. 6(C) shows the waveform of the output S when the sensor 16 is affected by the external disturbances in a state where the sensor 16 is at a position confronting the inner window frame part 30b. The peak 36 is low in this case, while the peak 37 is relatively higher than the peak 36. In this case, the waveform of the output S only intersects the first threshold level $L_1$ twice, but intersects the second threshold level $L_2$ four times.

As shown in FIG. 6(A), the comparator 21 produces a signal $K_1$ which assumes a level "1" at a position $P_6$ and a level "0" at a position $P_7$. On the other hand, the comparator 22 produces a signal $K_2$ shown in FIG. 6(B) which assumes a level "1" at a position $P_1$, a level "0" at a position $P_4$, a level "1" at a position $P_5$, and a level "0" at a position $P_8$. In this case, the slot 30c is detected based on the signal $K_2$.

FIG. 7(C) shows the waveform of the output S when the sensor 16 is affected by the external disturbances in a state where the sensor 16 is at a position confronting the outer window frame part 30a. The peak 37 is low in this case, while the peak 36 is relatively higher than the peak 37. In this case, the waveform of the output S only intersects the first threshold level $L_1$ twice, but intersects the second threshold level $L_2$ four times.

As shown in FIG. 7(A), the comparator 21 produces a signal $K_1$ which assumes a level "1" at a position $P_2$ and a level "0" at a position $P_3$. On the other hand, the comparator 22 produces a signal $K_2$ shown in FIG. 7(B) which assumes a level "1" at a position $P_1$, a level "0" at a position $P_4$, a level "1" at a position $P_5$, and a level "0" at a position $P_8$. In this case, the slot 30c is detected based on the signal $K_2$.

Accordingly, one of the comparators 21 and 22 always produces a signal which assumes the level "1" twice, even in a case where workpieces having window frames of different colors are conveyed in a random sequence, and even in a case where the sensor 16 is affected by external disturbances. Hence, it is possible to positively detect the slot 30c based on the signal which is obtained from one of the comparators 21 and 22 and assumes the level "1" twice.

Next, description will be given with respect to the operation of the microcomputer 23 shown in FIG. 2 by referring to a flow chart shown in FIG. 8, for a case where the signals $K_1$ and $K_2$ shown in FIGS. 3(A) and 3(B) are obtained from the first and second comparators 21 and 22.

The operation of the microcomputer 23 starts from a step 40. A step 41 discriminates whether the high-sensitivity signal $K_2$ assumes the level "1". When the discrimination result in the step 41 is NO, a step 42 discriminates whether the sensor 16 is positioned within a predetermined range for the detection of the slot 30c, that is, whether the sensor 16 is positioned between starting and ending positions of the detection. The starting and ending positions of the detection are preset in the microcomputer 23. When the discrimination result in the step 42 is NO, an error processing operation is carried out in a step 43, the sensor 16 is returned to the original position, and the microcomputer 23 starts to carry out the operation from the beginning. On the other hand, when the discrimination result in the step 42 is YES, the operation is returned to the step 41.

When the signal $K_2$ assumes a level "1" at a time $t_1$ and the discrimination result in the step 41 becomes YES, it is detected that the sensor 16 has reached the position $P_1$, and a subsequent step 44 discriminates whether the signals $K_2$ and $K_1$ both assume a level "1". When the discrimination result in the step 44 is NO, a step 45 discriminates whether the sensor 16 is positioned within the predetermined range for the detection of the slot 30c. When the discrimination result in the step 45 is NO, an error processing operation is carried out in a step 46 in a manner a similar to the operation carried out in the step 43 described before. On the other hand, when the discrimination result in the step 45 is YES, a subsequent step 47 discriminates whether the signal $K_2$ assumes a level "0". The operation is returned to the step 44 when the discrimination result in the step 47 is NO.

When the signal $K_1$ assumes a level "1" in a state where the signal $K_2$ assumes the level "1", the discrimination result in the step 44 becomes YES, and it is detected that the sensor 16 has reached the position $P_2$. Hence, a subsequent step 48 discriminates whether the signal $K_1$ assumes a level "0". When the discrimination result in the step 48 is NO, the operation is returned to the step 48. In other words, the step 48 is repeatedly carried out until the discrimination result becomes YES. When the signal $K_1$ assumes the level "0" and the discrimination result of the step 48 becomes YES, it is detected that the sensor 16 has reached the position $P_3$. Thus, a step 49 discriminates whether the signal $K_2$ assumes a level "0". When the discrimination result in the step 49 is NO, a step 50 discriminates whether the signal $K_1$ assumes a level "1". A subsequent step discriminates whether the sensor 16 is positioned within the predetermined range for the detection of the slot 30c, when the discrimination result in the step 50 is NO. When the discrimination result in the step 51 is NO, a step 52 carries out an error processing operation in a manner similar to the operation carried out in the step 43 described before. On the other hand, when the discrimination result in the step 51 is YES, the operation is returned to the step 48.

When the discrimination result in the step 49 becomes YES, it is detected that the sensor 16 has reached the position $P_4$, and the operation advances to a step 53 so as to discriminate whether the sensor 16 is positioned within the predetermined range for the detection of the slot 30c. When the discrimination result in the step 53 is NO, a step 54 carries out an error processing operation in a manner similar to the operation carried out in the step 43 described before. On the other hand, when the discrimination result in the step 53 is YES, a step 55 discriminates whether the signal $K_2$ assumes a level "1". The discrimination result in the step 55 becomes YES when the signal $K_2$ assumes a level "1" in a state where the sensor 16 assumes the position $P_5$. Hence, it is detected that the sensor 16 has reached the position $P_5$ when the discrimination result in the step 55 is YES. A step 56 calculates an intermediate point between the positions $P_4$ and $P_5$. This intermediate point is a center position of the slot 30c. The arm 12 is returned to the calculated position of the slot 30c and the slot 30c is engaged by the rod 18 in a step 57. The door 30 is opened so as to paint the inside of the workpiece in steps which follow the step 57, as is done in the conventional painting robot. Therefore, the steps which follow the step 57 are not shown in FIG. 8 and description thereof will be omitted.

In a case where the output S of the sensor 16 has the waveform shown in FIG. 4(C), the discrimination result in the step 44 becomes YES after a discrimination result YES is obtained in the step 41, and it is detected that the sensor 16 has reached the position $P_2$. Thereafter, the discrimination result in the step 48 becomes YES, and it is detected that the sensor 16 has reached the position $P_3$. When the discrimination result in the step 49 is NO and the discrimination result in the step 50 becomes YES, it is detected that the sensor 16 has reached the position $P_6$. Next, a step 58 calculates an intermediate point between the position $P_3$ which is detected in the step 48 and the position $P_6$ which is detected in the step 50, and the operation then advances to the step 57.

On the other hand, when the output S of the sensor 16 has the waveform shown in FIG. 5(C), the discrimination result in the step 44 is always NO after a discrimination result YES is obtained in the step 41. It is detected that the sensor 16 has reached the position $P_4$ when the discrimination result in the step 47 becomes YES. Next, it is detected that the sensor 16 has reached the position $P_5$ when the discrimination result in the step 55 becomes YES, and the operation advances to the step 56.

Further, when the output S of the sensor 16 has the waveform shown in FIG. 6(C), it is similarly detected that the sensor 16 has reached the positions $P_1$, $P_4$, and $P_5$ in the steps 41, 47, and 55, and the intermediate point between the positions $P_4$ and $P_5$ is calculated in the step 56.

In addition, when the output S of the sensor 16 has the waveform shown in FIG. 7(C), it is similarly detected that the sensor 16 has reached the positions $P_1$, $P_2$, $P_3$, $P_4$, and $P_5$ in the steps 41, 44, 48, 49, and 55, and the intermediate point between the positions $P_4$ and $P_5$ is calculated in the step 56.

The slot 30c may also be detected in a similar manner by once moving the sensor 16 to a position confronting the inner window frame part 30b and then moving the sensor 16 in the direction of the arrow B.

Next, description will be given with respect to a second embodiment of a slot detecting apparatus according to the present invention, by referring to FIG. 9.

FIG. 9 shows the second embodiment of the slot detecting apparatus according to the present invention, and in FIG. 9, those parts which are the same as those corresponding parts in FIG. 2 are designated by the same reference numerals and their description will be omitted. The output S which is obtained from the sensor 16 as the sensor 16 moves in the direction of the arrow A above the door 30, is amplified in the amplifier 20 and is supplied to an analog-to-digital (A/D) converter 70. The output S is sampled at predetermined positions of the sensor 16, and is converted into a digital signal D having a predetermined number of bits. The output digital signal D of the A/D converter 70 is supplied to a microcomputer 71.

A ROM 72 of the microcomputer 71 pre-stores N+1 threshold levels $L_i$. A RAM 73 of the microcomputer 71 provides the work area or the like. A CPU 74 of the microcomputer 71 successively reads out the stored threshold levels $L_i$ ($i=1, 2, \ldots, N+1$) which are described in the form of digital signals. The digital signal D is compared with the threshold levels $L_i$ so as to detect the two sides of the waveform of the output S which define the valley 35, and the center of the slot 30c is calculated.

The operation of the microcomputer 71 will now be described by referring to FIGS. 10 and 11.

In actual practice, the digital signal D is compared with the threshold levels which are successively read out. However, for convenience' sake, FIG. 11 shows comparison between the output S and each of the threshold levels $L_i$. Further, the operation of the microcomputer 71 will be described for a case where the output S has a waveform shown in FIG. 11.

The operation of the microcomputer 71 starts from a step 80, and a step 81 sets all N comparison data $C_{pi}$ ($i=1, 2, \ldots, N$) to 1. The N comparison data $C_{pi}$ are written into the RAM 73. The comparison data are renewed when discrimination results of steps 83, 86, 90, and 94 which will be described later on in the specification are YES. For example, the comparison data are renewed as shown in FIGS. 11(A) through FIG. 11(D).

Next, a step 82 discriminates whether the value of the comparison data $C_{pi}$ is equal to 1, for $i=1, 2, \ldots, N$. When the discrimination result in the step 82 is YES, the subsequent step 83 discriminates whether the level of the signal D is greater than the threshold level $L_i$, for $i=1, 2, \ldots, N$. When the discrimination result in the step 83 is YES for a certain value of i, a step 84 renews the value of the comparison data $C_{pi}$ to a value 2 for this certain value of i. As may be seen from FIG. 11, the comparison data $C_{p1}$ is renewed to the value 2 at a position $P_{54}$, the comparison data $C_{p2}$ is renewed to the value 2 at a position $P_{53}$, the comparison data $C_{p3}$ is renewed to the value 2 at a position $P_{52}$, and the comparison data $C_{p4}$ is renewed to the value 2 at a position $P_{51}$. When the discrimination result in the step 83 is YES, it is discriminated that the starting end of the peak 36 has been detected.

Thereafter, a step 85 discriminates whether the comparison data $C_{pi}$ is equal to 2, for $i=1, 2, \ldots, N$. When the discrimination result in the step 85 is YES, the subsequent step 86 discriminates whether the level of the signal D is smaller than the threshold level $L_{i+1}$, for $i=1,2, \ldots, N$. When the discrimination result in the step 86 is YES for a certain value of i, a step 87 renews the value of the comparison data $C_{pi}$ to a value 3 for this certain value of i. In this example, the comparison data $C_{p1}$ is renewed to the value 3 at a position $P_{55}$ and the comparison data $C_{p2}$ is renewed to the value 3 at a position $P_{56}$, as may be seen from FIG. 11. A subsequent step 88 stores the positions $P_{55}$ and $P_{56}$ of the sensor 16 at this instant, that is, one of the sides defining the valley 35.

Next, a step 89 discriminates whether the comparison data $C_{pi}$ is equal to 3, for $i=1, 2, \ldots, N$. In this example, the discrimination result in the step 89 is YES for the comparison data $C_{p1}$ and $C_{p2}$, and the discrimination result is NO for other comparison data. When the discrimination result in the step 89 is YES, the step 90 discriminates whether the level of the signal D is greater than the threshold level $L_i$, for $i=1, 2, \ldots, N$. When the discrimination result in the step 90 is YES for a certain value of i, a step 91 renews the value of the comparison data $C_{pi}$ to a value 4 for this certain value of i. In this example, only the comparison data $C_{p2}$ is renewed to the value 4 at a position $P_{57}$, because the level of the peak 37 is low. A subsequent step 92 stores the position $P_{57}$ of the sensor 16 at this instant, that is, the other of the sides defining the valley 35.

Further, a step 93 discriminates whether the comparison data $C_{pi}$ is equal to 4, for $i=1, 2, \ldots, N$. In this example, the discrimination result in the step 93 is YES for only the comparison data $C_{p2}$, and the discrimination result is NO for other comparison data. When the discrimination result in the step 93 is YES, the step 94 discriminates whether the level of the signal D is smaller than the threshold level $L_{i+1}$, for $i=1, 2, \ldots, N$. When the discrimination result is YES for a certain value of i, a step 95 renews the value of the comparison data $C_{pi}$ to a value 5 for this certain value of i. In this example, only the comparison data $C_{p2}$ is renewed to the value 5 at a position $P_{58}$. When the discrimination result in the step 94 is YES, it is discriminated that the terminal end of the peak 37 has been detected.

A step 96 discriminates whether the sensor 16 is positioned within the predetermined range for the detection of the slot 30c. The operation is returned to the step 82 when the discrimination result in the step 96 is YES. On the other hand, when the discrimination result in the step 96 is NO, a step 97 discriminates whether the comparison data $C_{pi}$ is equal to 5, for $i=1, 2, \ldots, N$. When the discrimination result in the step 97 is NO, an error processing operation is carried out in a step 98, the sensor 16 is returned to the original position, and the operation of the microcomputer 71 is started from the beginning. When the discrimination result in the step 97 is YES, a step 99 calculates an intermediate point between the positions of the sensor 16 which were stored in the steps 88 and 92. Since the value of the comparison data $C_{p2}$ is equal to 5 in this example, the discrimination result in the step 97 is YES, and the step 99 calculates the intermediate point between the positions $P_{56}$ and $P_{57}$. This intermediate point corresponds to the center of the slot 30c. Next, the rod 18 engages the slot 30c, and operations described before are carried out to paint the inside of the workpiece.

In the steps 86 and 94, the level of the signal D is compared with the threshold level $L_{i+1}$, for $i=1, 2, \ldots, N$, rather than comparing the level of the signal D with a threshold level $L_i$, so that an erroneous detection will not take place even when the level of the digital signal D varies.

According to the second embodiment, it is possible to easily set the threshold level in a plurality of stages. Hence, even in a case where the slot 30c cannot be detected in the first embodiment described before, the slot 30c can be positively detected according to this second embodiment. Moreover, the slot detecting apparatus may be easily set to detect slots having different size and shape, because the threshold level can be changed with ease. In addition, the construction of the slot detecting device is simplified because no comparators are employed.

In the embodiments described heretofore, it was described that the workpiece to be painted is a locker, for example, however, the workpiece may be an automobile or the like.

Further, the present invention is not limited to these embodiments, but various variations and modifications may be made without departing from the scope of the present invention.

What is claimed is

1. A slot detecting apparatus comprising
   a sensor for detecting a slot of a workpiece, said sensor being movable over said workpiece so as to traverse said slot and producing an output having a waveform;
   an analog-to-digital converter for sampling the output of said sensor at a plurality of points and for converting the output of said sensor into an output digital signal having levels corresponding to the sampled levels;
   comparing means for comparing said output digital signal with a plurality of threshold levels which are mutually different, and for producing a comparison result for each of the plurality of threshold levels; and
   discriminating means for discriminating the position of said slot based on a comparison result which indicates that the output of said sensor has the waveform from among a plurality of comparison results which are obtained from said comparing means for the plurality of threshold levels, said comparing means and said discriminating means being constituted by a microcomputer which has a memory part and a central processing unit, said memory part being pre-sorted with threshold digital signals indicating the plurality of threshold levels with which said output digital signal is compared, said central processing unit successively reading out the stored threshold digital signals from said memory part and comparing said output digital signal with the read out threshold digital signals.

2. A slot detecting apparatus as claimed in claim 1 in which said central processing unit renews values of comparison data according to compared results which are obtained by comparing said output digital signal with the read out threshold digital signals, and calculates the position of said slot from a position of said sensor at a time when the renewal is being carried out for a j-th time when the value of the comparison data assumes a predetermined value, where j is a predetermined integer, each of said comparison data indicating a number of times the waveform of the output of said sensor crosses one of the plurality of threshold levels.

* * * * *